(12) United States Patent
Spies et al.

(10) Patent No.: US 8,919,258 B2
(45) Date of Patent: Dec. 30, 2014

(54) ARRANGEMENT OF A RAIL AND A SLIP CONTACT HOLDER MOUNTED THEREON

(75) Inventors: Gerd Spies, Herdecke (DE); Stefan Fitzler, Iserlohn (DE); Sven Müller, Breckerfeld (DE)

(73) Assignee: Terex MHPS GmbH, Düsseldorf (DE)

( * ) Notice: Subject to any disclaimer, the term of this patent is extended or adjusted under 35 U.S.C. 154(b) by 161 days.

(21) Appl. No.: 13/821,924

(22) PCT Filed: Sep. 5, 2011

(86) PCT No.: PCT/EP2011/065327
§ 371 (c)(1),
(2), (4) Date: Mar. 8, 2013

(87) PCT Pub. No.: WO2012/034893
PCT Pub. Date: Mar. 22, 2013

(65) Prior Publication Data
US 2013/0167750 A1    Jul. 4, 2013

(30) Foreign Application Priority Data

Sep. 14, 2010    (DE) .......................... 10 2010 037 520

(51) Int. Cl.
| | |
|---|---|
| *B66C 7/08* | (2006.01) |
| *H02G 5/04* | (2006.01) |
| *E01B 25/24* | (2006.01) |
| *B66C 7/02* | (2006.01) |

(52) U.S. Cl.
CPC . *B66C 7/08* (2013.01); *E01B 25/24* (2013.01); *H02G 5/04* (2013.01); *B66C 7/02* (2013.01)
USPC .............................. 104/94; 104/89; 191/23 R

(58) Field of Classification Search
CPC .............. B66C 7/02; B66C 7/08; H02B 5/04; E01B 25/24
USPC ............................... 104/89, 93, 94; 191/23 R
See application file for complete search history.

(56) References Cited

U.S. PATENT DOCUMENTS

| | | |
|---|---|---|
| D47,724 S | 8/1915 | Heulings, Jr. |
| D47,725 S | 8/1915 | Heulings, Jr. |

(Continued)

FOREIGN PATENT DOCUMENTS

| | | |
|---|---|---|
| CA | 1203194 | 4/1986 |
| CH | 429816 | 2/1967 |

(Continued)

OTHER PUBLICATIONS

International Preliminary Examination Report from corresponding International Application PCT/EP2011/065327.

(Continued)

*Primary Examiner* — Zachary Kuhfuss
(74) *Attorney, Agent, or Firm* — Gardner, Linn, Burkhart & Flory, LLP

(57) ABSTRACT

An arrangement of a rail for suspended conveyors or suspended cranes and a slip contact holder mounted thereon, wherein the rail comprises a profile body and a profile head connected thereto and disposed above the profile body, wherein the profile body is C-shaped in cross section, forms a hollow space for chassis, and has a slit open to the bottom, and the profile head comprises upper, substantially horizontal profile walls and the slip contact holder is disposed within the hollow space and attached to the upper profile walls. A plurality of punchouts are disposed in the upper profile walls, disposed in at least one row and at regular, repeated distances as seen in the longitudinal direction of the rail, and barb-like catch pawls are disposed on the slip contact bolder and engage with the punchouts in order to attach thereto.

20 Claims, 4 Drawing Sheets

(56) References Cited

U.S. PATENT DOCUMENTS

| | | | |
|---|---|---|---|
| D158,461 S | 5/1950 | Hammerly | |
| D189,447 S | 12/1960 | Attwood | |
| 3,124,239 A | 3/1964 | Kornylak | |
| D200,099 S | 1/1965 | Attwood | |
| 3,452,501 A | 7/1969 | Zimmer et al. | |
| 3,813,480 A * | 5/1974 | Sprague | 174/92 |
| D238,510 S | 1/1976 | Tabler | |
| D238,777 S | 2/1976 | Rodney | |
| 3,974,777 A | 8/1976 | Monne | |
| 4,102,007 A | 7/1978 | Janson | |
| 4,524,698 A | 6/1985 | Tourtellier et al. | |
| 4,768,442 A | 9/1988 | Miller | |
| D306,078 S | 2/1990 | Whitney | |
| 5,074,407 A | 12/1991 | Brumby | |
| 5,271,586 A | 12/1993 | Schmidt | |
| D346,260 S | 4/1994 | Silbersky et al. | |
| 5,400,717 A | 3/1995 | Hoehn | |
| 5,410,937 A | 5/1995 | Okamoto et al. | |
| 5,443,151 A | 8/1995 | Taylor | |
| 5,598,785 A | 2/1997 | Zaguroli, Jr. | |
| D381,176 S | 7/1997 | Patois et al. | |
| D384,470 S | 9/1997 | Kubsik et al. | |
| 5,704,571 A | 1/1998 | Vargo | |
| 6,283,038 B1 | 9/2001 | Mattila | |
| D456,585 S | 4/2002 | Sandstroem | |
| D464,783 S | 10/2002 | Abbestam | |
| D511,580 S | 11/2005 | Ryan et al. | |
| D515,266 S | 2/2006 | Moe | |
| 7,784,627 B2 * | 8/2010 | Birkigt et al. | 212/315 |
| 7,845,285 B2 * | 12/2010 | Hast | 104/107 |
| D650,143 S | 12/2011 | Bhosale et al. | |
| 8,104,731 B2 | 1/2012 | Faucher et al. | |
| D655,884 S | 3/2012 | Spies et al. | |
| 8,251,329 B2 | 8/2012 | Suciu et al. | |
| 8,464,478 B2 | 6/2013 | Tweedie | |
| 8,590,456 B2 * | 11/2013 | Ipsen | 104/94 |
| 2002/0079347 A1 | 6/2002 | Ezumi et al. | |
| 2005/0098059 A1 | 5/2005 | Wallner | |
| 2006/0137564 A1 | 6/2006 | Wallner | |
| 2008/0041806 A1 | 2/2008 | Birkigt et al. | |
| 2008/0230503 A1 | 9/2008 | Birkigt et al. | |
| 2010/0096438 A1 | 4/2010 | Sato et al. | |
| 2011/0191986 A1 | 8/2011 | Smith | |
| 2013/0153730 A1 | 6/2013 | Spies et al. | |
| 2013/0164078 A1 | 6/2013 | Spies et al. | |
| 2013/0167749 A1 | 7/2013 | Spies et al. | |

FOREIGN PATENT DOCUMENTS

| | | |
|---|---|---|
| CN | 1312141 A | 9/2001 |
| CN | 101595263 A | 12/2009 |
| CN | 101595264 A | 12/2009 |
| CN | 101641478 A | 2/2010 |
| DE | 914895 | 9/1954 |
| DE | 1249301 | 9/1967 |
| DE | 7346004 | 4/1974 |
| DE | 3211923 A1 | 10/1983 |
| DE | 3311362 C1 | 7/1984 |
| DE | 3329328 | 2/1985 |
| DE | 3326103 | 3/1985 |
| DE | 4109051 | 9/1992 |
| DE | 9310593 | 9/1993 |
| DE | 29903470 | 9/1999 |
| DE | 10115565 | 9/2002 |
| DE | 10337122 A1 | 3/2005 |
| DE | 10337121 | 6/2005 |
| DE | 102006058422 | 6/2008 |
| EP | 1031529 | 2/2000 |
| EP | 1205420 | 11/2000 |
| EP | 1928777 | 8/2006 |
| FR | 2201561 | 4/1974 |
| GB | 687367 | 2/1953 |
| GB | 1088878 | 10/1967 |
| GB | 2117337 A | 10/1983 |
| GB | 2137150 A | 10/1984 |
| JP | 2000042759 | 2/2000 |
| SE | 9200711 L | 9/1993 |

OTHER PUBLICATIONS

International Search Report and Written Opinion of corresponding PCT Application PCT/EP2011/065327 mailed Dec. 12, 2011.

Translation of International Search Report from corresponding International Application PCT/EP2011/065327.

Document showing construction of KBK II rail produced by Demag Cranes & Components GmbH discussed in the background of the present application.

HB-System brochure by ABUS Kransysteme GmbH (Aug. 2009).

English translation of International Preliminary Report on Patentability from corresponding International Application PCT/EP2011/065327.

* cited by examiner

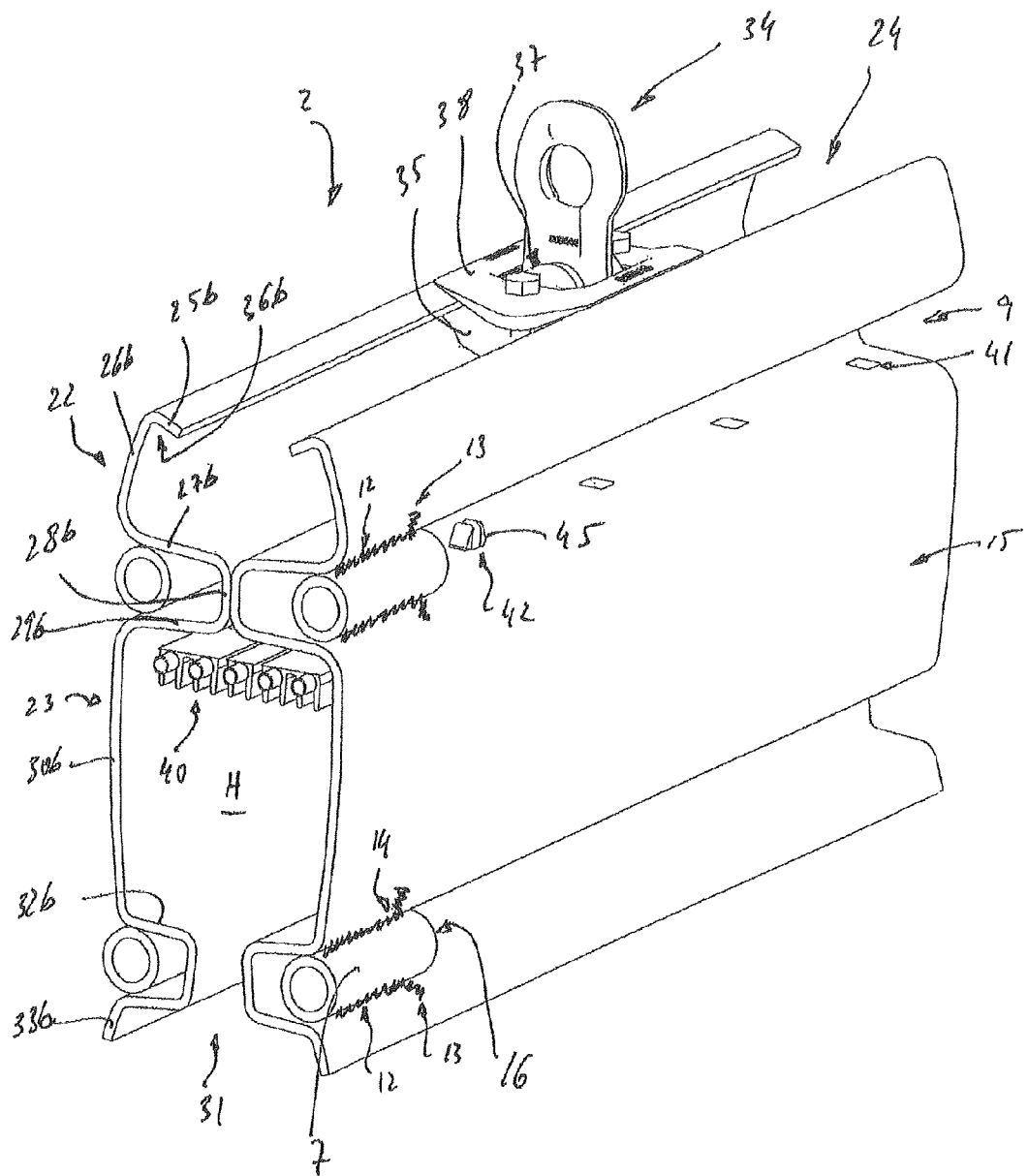

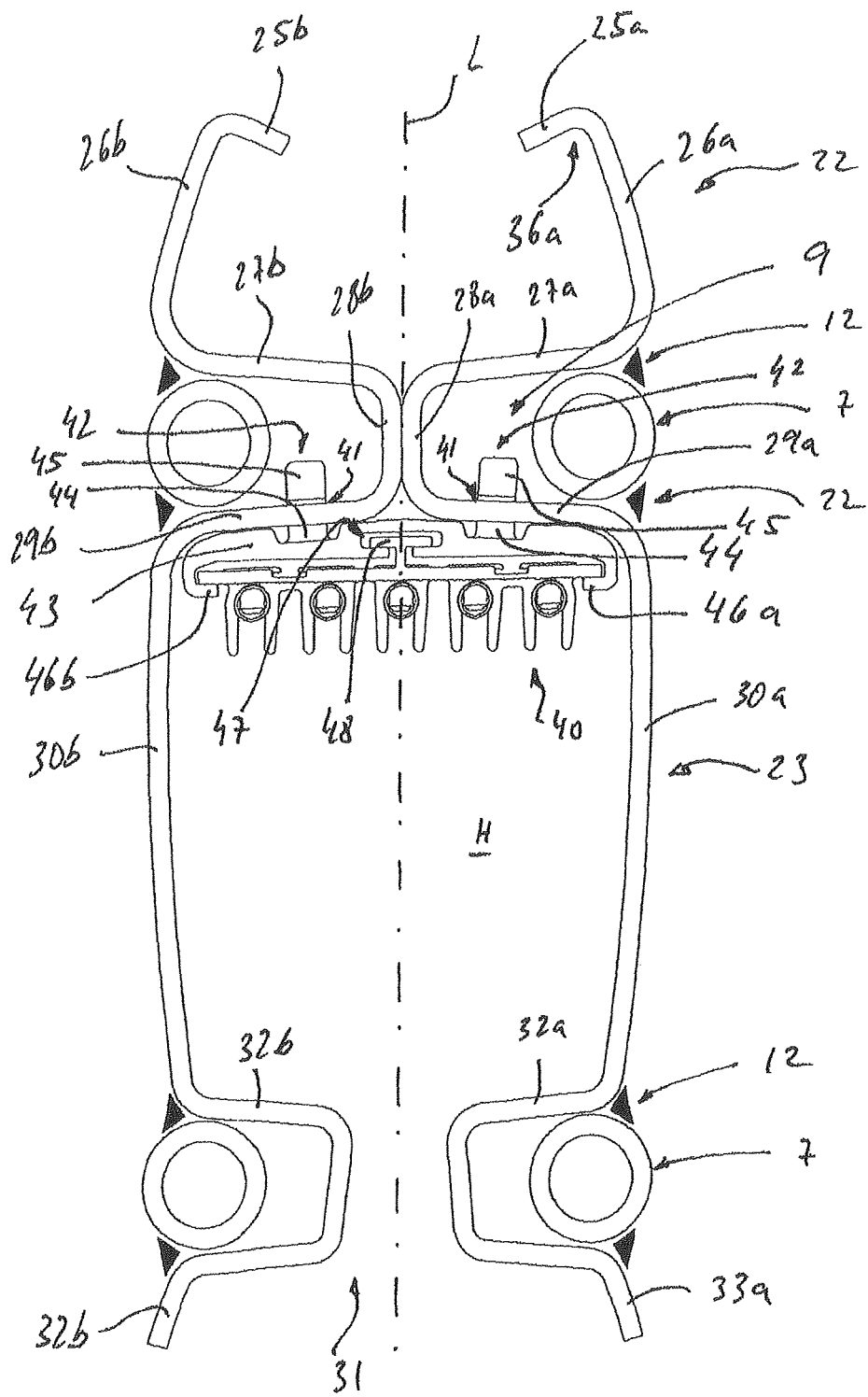

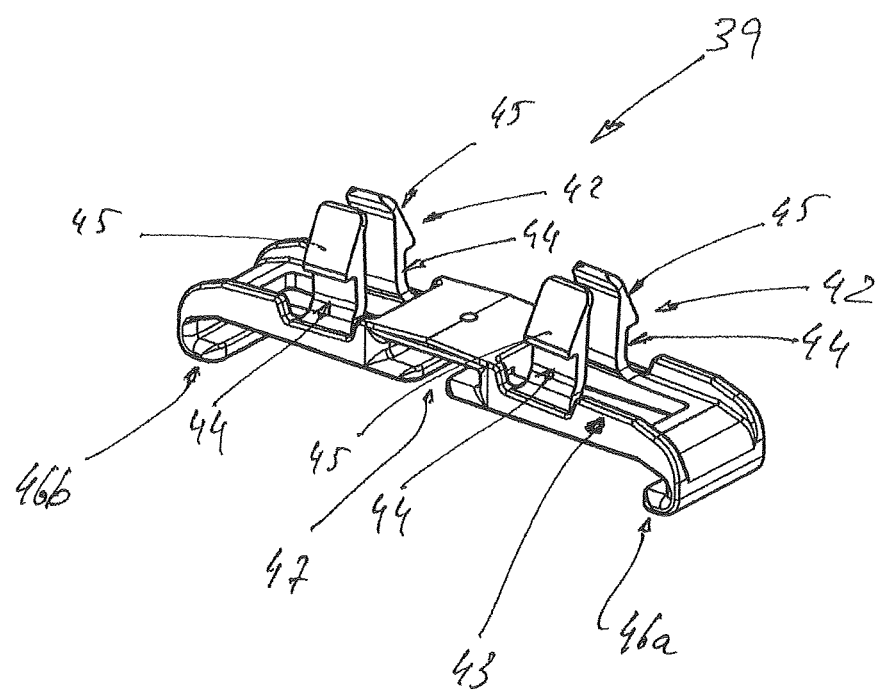

ARRANGEMENT OF A RAIL AND A SLIP CONTACT HOLDER MOUNTED THEREON

CROSS REFERENCE TO RELATED APPLICATIONS

The present application claims the priority benefits of International Patent Application No. PCT/EP2011/065327, filed on Sep. 5, 2011, and also of German Patent Application No. DE 10 2010 037 520.9, filed on Sep. 14, 2010, which are hereby incorporated herein by reference in their entireties.

BACKGROUND OF THE INVENTION

The invention relates to an arrangement consisting of a rail for suspended tracks or suspension cranes and a contact line holder attached thereto, wherein the rail has a profile body and a profile head connected thereto and disposed above the profile body, wherein the profile body is c-shaped when seen in cross-section, forms a hollow chamber for travelling mechanisms and is formed with a slot open in the downwards direction, the profile body has upper profile walls extending essentially horizontally, and the contact line holder is disposed inside the hollow chamber in the region of the upper profile walls and is attached to the upper profile walls.

Corresponding rails conventionally have a rail head to provide a suspension for attachment to roofs, walls etc, and a rail body for provision of the functional aspects such as tracks for bogies, carrying portions etc, Such self-supporting tubular rails for suspended tracks, suspension cranes and the like are known, e.g. from DE 1 249 301. The rail described therein is composed, in cross-section, of e.g. two thin-walled profiles which are disposed symmetrically with respect to the vertical longitudinal middle plane, surround roller pairs of a travelling mechanism with upper walls and side walls extending in an inclined manner downwards towards the longitudinal middle plane and two tracks, which lie on both sides of a lower slot and are inclined downwards towards this slot, and are provided at the top on the longitudinal middle plane with a respective first web directed upwards and then outwards from the longitudinal middle plane, which web lies against the web of the second profile rod in the upwardly directed part and is connected thereto. The upper profile walls descend outwards from the longitudinal middle plane and the space between the inclined side walls is only so large that the rail provides space for a travelling mechanism, the width of which is determined only by a plate-shaped support body and rollers disposed tightly against this support body. The rail is attached e.g. to the roof of the building via the upwardly directed webs by means of a suspension, wherein the suspension clasps the upwardly directed webs in the outwardly directed part.

In the case of such rails, in order to supply an internal current collector carriage, it is known to provide contact lines which lie against one of the inner walls and which are attached to the inner walls by means of the contact line holder.

A corresponding so-called KBK II-R hollow rail with internal bogie track and contact line disposed at the top is known from Demag Cranes & Components GmbH, Wetter, Germany. The KBK II-R profile is fitted with five internal power conductors. The power supply is effected via end or path feeds. The actual contact line is held via a holder which can be screwed to the upper profile walls from the outside, for which purpose it can be pushed into a c-shaped, downwardly-open groove in the holder. The holder is thus held on both sides by screws screwed in from the outside. The holders can be disposed with a preset spacing along the rail portions, for which purpose corresponding through bores are formed for the attachment screws.

Although this construction has proved its worth, it is not readily usable with rails in which there is no access or only poor access to the upper profile walls from the outside, as is the case with double-chamber rails. Double-chamber rails have, apart from the tubular or chamber-like profile body, a correspondingly formed profile head above the profile body. Thus, as seen in cross-section, an approximate FIG. 8 is produced. Therefore the upper profile walls of the profile body are not readily accessible for screw attachment since they are covered by the profile head.

On the other hand, accessibility from inside is practically impossible since the lower slot of such rails hardly allows any access owing to its narrow width.

From DE 103 37 122 A1 a dovetailed power rail is known which is pushed into a groove channel of the corresponding rail from the end of the section and is attached by means of the dovetail guide.

In the case of longer rail sections, however, a contact line holder would be desired not only at the more easily accessible rail section ends.

A contact line arrangement is known form DE 33 11 362 C1, having mutually parallel contact lines which are attached to a common holder and are disposed on a support rail via this holder. The two-part holder is held in bores of the support rail by means of a holding arm via sleeve-like spreading pins. The support rail is a simple I-shaped rail so that it is accessible from above in order to form the bores. Furthermore, it is already known from the French patent FR 2 201 561 to screw a contact line to a wall of a rail using a threaded screw. The Swiss patent CH 429 816 describes the provision of a large number of insulators on a rear side of a contact line in order by that means to attach the contact line to a rail. The insulators are inserted in bores in a wall of the rail and are held therein in the manner of a snap connection. For this purpose, each insulator is provided with two latch elements which, upon insertion of the insulator into the bore, can move towards each other elastically and spring back in their final position and engage behind the bore.

The patent document U.S. Pat. No. 4,524,698 A discloses a rail which includes a profile body having a hollow chamber for travelling mechanisms and a profile head. In the upper region of the hollow chamber, contact lines are disposed which are attached to the upper profile walls via a contact line holder.

SUMMARY OF THE INVENTION

The invention provides an arrangement consisting of a rail and a contact line holder attached thereto, which offers simple and secure attachment of the contact line.

In accordance with an embodiment of the invention, in the case of an arrangement consisting of a rail for suspended tracks or suspension cranes and of a contact line holder attached thereto, wherein the rail has a profile body and a profile head connected thereto and disposed above the profile body, wherein the profile body is c-shaped when seen in cross-section, forms a hollow chamber for travelling mechanisms and is formed with a slot open in the downwards direction, the profile body has upper profile walls extending essentially horizontally and the contact line holder is disposed inside the hollow chamber in the region of the upper profile walls and is attached to the upper profile walls, simple and secure attachment of the contact line is achieved in that a large number of punch-outs are provided in the upper profile walls and, when seen in the longitudinal direction of the rail, are disposed in at least one row and at regular repeated intervals and barb-like latching lugs are disposed on the contact line holder and engage into the punch-outs to effect attachment, wherein latching lugs of the contact line holders are disposed only in some of the large number of punch-outs. Since a plurality of punch-outs are disposed at a regular repeating interval, i.e. at a spacing, in the longitudinal direction of the rail, it is possible for a plurality of contact line holders to be attached when necessary in a simple manner and as desired at suitable locations and at suitable intervals. Since the upper profile walls are provided with punch-outs and the contact line holder is formed with barb-like latching lugs which engage into the punch-outs to effect attachment, the contact line holders can be clipped into the upper walls from below without the use of tools. For this purpose, the holders only have to be pushed with the latching lugs into the punch-outs from below. The punch-outs are, for this purpose, introduced into the raw metal sheets prior to the sheet metal profile being bent. The metal sheets are then bent and angled in such a way that they each constitute one half of the rail and the punch-outs are disposed at the desired location. Since a large number of punch-outs are provided the contact lines can be attached by means of a desired number of contact line holders. Naturally, the majority of the punch-outs are then unoccupied.

A latching lug is understood in this case to mean a pin-like tab standing out with respect to the main body of the holder in a transverse, preferably approximately perpendicular, manner, which tab is formed with a barb-like protrusion at its end remote from the main body of the holder.

In an embodiment, as seen in the longitudinal direction of the rail, at least two rows of punch-outs are disposed next to each other and the punch-outs of the at least two rows are disposed spaced apart from each other and next to each other in relation to the longitudinal direction of the rail.

In a particular embodiment the punch-outs are formed in a rectangular, in particular square, manner as seen in plan.

As a preferred location for the punch-outs provision is made to dispose them on both sides of the webs connecting the profile head and the profile body.

In an embodiment provision is made for the latching lugs to be disposed in pairs on the contact line holder for engagement into two of the punch-outs. This produces simple and secure holding and the contact line holder is held in a stable and non-rotatable manner. In other words, there are pairs of mutually opposing latching lugs and punch-outs disposed on the left and right of the longitudinal middle plane respectively. In a preferred manner, the barb-like protrusions are oriented away from each other in each case in order to engage behind the profiled sheet metal. The barb-like protrusions are usefully chamfered in the longitudinal direction of the latching lugs so that they can easily be introduced into the punch-outs. In addition, it is useful for the individual latching lugs to be pretensioned away from each other so that secure engagement behind the profile walls is achieved.

In a particular embodiment of the rail, provision is made that profile side walls, which extend in a slightly inclined manner downwards towards a longitudinal middle plane of the profile body adjoin the upper profile walls, lower profile walls adjoin the lower end of the profile side walls and are inclined downwards towards the lower slot.

The profile head, as seen in cross-section, may comprise a profile head which is essentially C-shaped and open in the upwards direction, the opening of which forms a gap extending along the longitudinal middle plane.

Further details, features and advantages of the invention are provided by the following description of an exemplified embodiment with the aid of the drawing in which:

BRIEF DESCRIPTION OF THE DRAWINGS

FIG. 2 is a perspective view of an arrangement in accordance with the invention consisting of a rail and contact line holder and FIG. 3 is an end-face view of the arrangement of FIG. 2 and FIG. 4 is a perspective schematic view of the contact line holder of FIG. 2.

DESCRIPTION OF THE PREFERRED EMBODIMENTS

Figure 1:
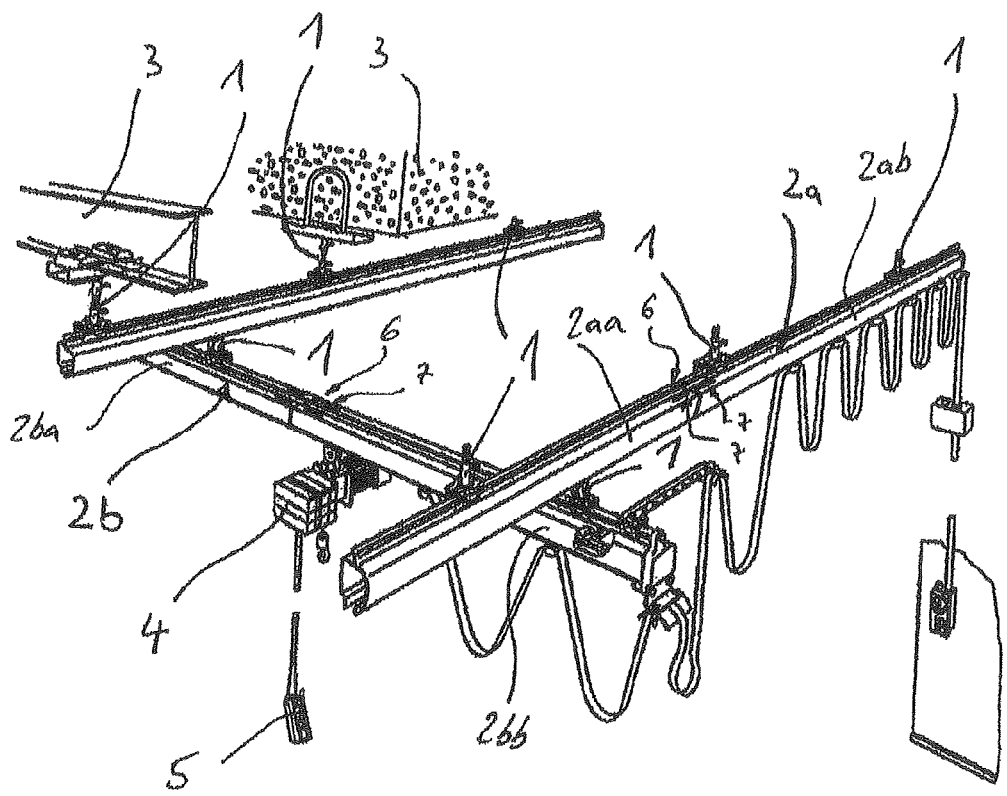
FIG. 1 is a perspective schematic view of a single-girder suspension crane in accordance with the prior art to illustrate the possible uses of corresponding rails.

In order to illustrate the widest range of possible uses of connected rail sections to form rails, in FIG. 1 a single-girder suspension crane according to the prior art is shown.

By virtue of suspension means 1, essentially horizontally extending c-shaped profiled rails 2, which are open in the downwards direction, are suspended on bearing elements 3 or further rails 2. The bearing elements 3 are formed as I beams. Since the present exemplified embodiment relates to a single-girder suspension crane, two first rails 2a, which extend essentially horizontally, in parallel and spaced apart from each other, are provided and serve as rails for the single-girder suspension crane, as is a second rail 2b, which forms a crane rail, which is oriented essentially transverse to the first rails 2a and can travel along the first rails 2a. For this purpose the second rail 2b is suspended via two suspension means 1 in each case on a travelling mechanism, not shown, which can travel along the first rails 2a. In a conventional manner, a lifting gear 4, such as a chain or cable hoist, is suspended on the second rail 2b and is able to travel along the second rail 2b with a further travelling mechanism, not shown. The lifting gear 4 can be controlled via a pendant switch 5 suspended on the lifting gear 4.

The rails 2a, 2b can thus be selectively used as crane track or girder rails.

With the aid of FIGS. 2 to 4 an arrangement in accordance with the invention consisting of a rail 2 and a contact line holder 39 for a contact line 40 is now described. The rails will be discussed first.

The rails 2a and 2b each consist—depending on the length required—of two or more rail sections 2aa and 2ab or 2ba and 2bb.

The rail sections 2aa and 2ab or 2ba and 2bb are connected to each other by end-face abutment connections 6.

Only the abutment connection 6 of the rail sections 2aa and 2ab will be explained hereunder by way of example with the aid of FIGS. 2 and 3, since the abutment connection of the rail sections 2ba and 2bb is formed in a corresponding manner.

In order to form the abutment connections 6 of the rail sections 2aa and 2ab the rail sections 2aa and 2ab each have holding elements formed on their outsides as sleeves 7, which are disposed on the rail section ends 8 in longitudinally extending angular spaces or grooves 9 of the rail sections 2aa and 2ab.

In the illustrated example, four sleeves 7 are used per rail section and are each disposed in corresponding longitudinal grooves 9. Two sleeves 7 are provided for each long side of a rail section.

The sleeves 7 have screw bolts as connecting elements passing through them and form, for the heads or nuts thereof, a contact surface 16 as a counterbearing surface, extending transverse to the longitudinal direction of the rail sections.

The sleeves 7 are attached to the rail sections 2aa and 2ab in each case by a weld seam 12, extending in the longitudinal direction of the rail section 2aa and 2ab, on each of the two long sides of the sleeves 7. The weld seams 12 do not have to extend over the whole length of the sleeves 7 and can be formed differently from each other.

The end 13 of the weld seam 12 remote from the end face deviates from the longitudinal direction. In so doing, the end 13 forms an angle 14 with respect to the rest of the weld seam 12 and extends out of the groove 9 to the side surface 15 of the rail profile or the continuing profile wall.

The rail 2 consists in cross-section of two identical profiles 20a, 20b disposed symmetrically with respect to the vertical longitudinal middle plane L.

The rail has a profile head 22 disposed at the top in a relative manner along the longitudinal middle plane L and a profile body 23 connected to it and lying below it.

When seen in cross-section the profile head 22 is an essentially C-shaped profile head open in the upwards direction, the opening of which forms a gap 24 which extends along the longitudinal middle plane L and which is defined on both sides by first web portions 25a, 25b which, when seen from the longitudinal middle plane L, extend in an inclined manner outwards and upwards at the same time.

The angle 21 of the web portions 25a, 25b is about 25 degrees relative to the longitudinal middle plane L.

The profile head 22 also has, in cross-section, two opposing downwardly and outwardly extending second web portions 26a, 26b which adjoin the first web portions 25a, 25b, and finally third web portions 27a, 27b protruding back inwards in the direction of the vertical longitudinal middle plane L, which adjoin the second web portions 26a, 26b.

This means that the profile head 22 is wider at its base and narrows in the direction away from the profile body 23. Thus a suspension 34 for the rail 2 can be used which can "pivot into" the hollow profile head 22 through the gap 24 since the diagonal extension (as seen in cross-section) is therefore large enough to receive a pivotable pivot-in part 35 of the suspension 34, which is then pivoted approximately horizontally and in so doing engages in a positive-locking manner into the beads 36a, 36b of the profile head 22, which are formed by the first web portions 25a, 26b. Therefore, with appropriate mutually adapted dimensioning of the profile head 22 and of the suspension 23 or of its pivot-in part 25 the profile head 22 is held in a simple manner in the transverse direction by a positive locking arrangement.

Alternatively, the height of the profile head 22 would have to be substantially larger and the rail 2 as a whole could be formed in a less compact and rigid manner.

In order to attach and fix the suspension 34 to the profile head 22, the said pivot-in part 35 is first pivoted approximately vertically lying against the suspension on one side so that it can be introduced into the gap 24 with the other side.

The suspension 34 is then pushed with the pivot-in part 35 in an inclined manner into one of the lower corners of the profile head 22 which are formed by the web portions 26a, 27a or 26b, 27b.

It is then possible to introduce the lower end of the pivot-in part 35 past the web portion 25a or 25b into the gap 24 and finally to pivot the pivot-in part horizontally and to introduce it into the beads 36a, 36b. In order to provide fixing in the longitudinal direction of the gap 24 a frame-like counterbearing 38 is screwed to the pivot-in part 35, clamping in the web portions 25a and 25b.

The suspension 34 is therefore already carrying the rail 2 via the pivot-in part 35 without screwing etc. The entire load is therefore borne by the pivot bolt 37 of the suspension, which can be dimensioned to be substantially more load-bearing than a normal screw bolt of a clamping connection from the prior art.

In addition, fourth web portions 28a, 28b extending approximately along the longitudinal middle plane L are provided on the profile head 22, which adjoin the third web portions 27a, 27b and connect the profile head 22 to the profile body 23 via its upper profile walls 29a, 29b.

The fourth web portions 28a, 28b of the profile head 22 lie against each other and are welded to each other at that location. Therefore the profiles 20a, 20b are connected to form the rail 2.

With upper profile walls 29a, 29b, which extend essentially horizontally, and with profile side walls 30a, 30b extending in a slightly inclined manner downwards towards the longitudinal middle plane L and with two lower profile walls 32a, 32b lying on both sides of a lower slot 31 and being inclined slightly downwards towards it, the profile body 23 forms a hollow chamber H for travelling mechanisms, wherein lower profile walls 32a, 32b form a running surface for the corresponding wheels. In addition, it is possible to dispose a contact line in the region of the upper profile walls 29a, 29b.

The lower profile wall 32a, 32b at the slot 31 continues essentially downwards and then in an inclined manner outwards and finally in an inclined manner downwards. The end portions 33a, 33b thus formed of the lower profile wall 32a, 32b permit the weld seam 12 to be guided out as explained above.

The angle of end portions 33a, b of the lower profile wall 32a, 32b amounts to about 110 degrees relative to the horizontal.

The upper profile walls 29a, 29b are provided with punch-outs 41 which were introduced into the raw metal sheets before the sheet metal profile was bent. The metal sheets were then bent and angled in such a way that they each constitute one half of the rail 2 and the punch-outs 41 are disposed at the desired location in the groove 9 between the profile head 22 and the profile body 23 on both sides of the longitudinal middle plane L in each case next to the web or webs 28a, 28b.

The punch-outs 41 are disposed at a regular repeating interval, i.e. at a spacing, in the longitudinal direction of the rail. Therefore, a plurality of contact line holders 39 can be attached when necessary in a simple and selectable manner. In this case, only some of the large number of punch-outs 41 are occupied by latching lugs 42 of the contact line holders 39. Owing to the large number of punch-outs 41 the contact line holders 39 can be disposed in a desired number and at a desired interval as seen in the longitudinal direction of the rail 2. As seen in the longitudinal direction of the rail 2, two rows of punch-outs 41 are thus disposed next to each other. The punch-outs 41 of the at least two rows are also disposed spaced apart from and next to each other, i.e. at the same level with respect to the longitudinal direction of the rail 2.

The punch-outs 41 are formed square as seen in plan.

The contact line holder 39 is formed with barb-like latching lugs 42 (cf. FIG. 4) which engage into the punch-outs 41 to effect attachment, in order to clip or latch the contact line holder from below into the upper walls 29a, 29b without the use of tools. For this purpose the holder 39 only has to be pushed with the latching lugs 42 into the punch-outs 41 from below.

Each latching lug has a pin-like tab 44 standing out with respect to the main body 43 of the holder 39 approximately perpendicularly, which tab is formed with a barb-like protrusion 45 at its end remote from the main body 43 of the holder.

The barb-like protrusions 45 engage, during installation, behind the profiled sheet metal of the upper walls 29a, 29b in the region of the punch-outs 41. The barb-like protrusions 45 are chamfered in the longitudinal direction of the latching lugs 42 so that they can easily be introduced into the punch-outs 41 while being resiliently deflected in the meantime.

The contact line holder 39 is a strip-like injection moulded part which has an essentially downwardly open c-shape. On its rear facing upwards towards the upper walls 29a, 29b in the installed state, the latching lugs 42 are disposed in pairs. Thus in other words there are pairs of mutually opposing latching lugs 42 disposed in each case left and right of the longitudinal middle plane, the barb-like protrusions 45 of which latching lugs face away from each other.

With the lateral webs 46a, b of the "C" and with a correspondingly formed central groove 47 in the main body 43 the actual contact line 40 is supported.

For this purpose, it is pushed into the groove formed by the webs 46a, 46b of the "C" and the main body 43, wherein it engages behind the webs 46a, 46b and at the same time engages into the groove 47 with a central web 48 which has a T-shaped cross-section.

REFERENCE LIST 1 suspension means
2 rail
2aa, 2ab, 2ba, 2bb rail section
3 bearing elements
4 lifting gear
5 pendant switch
6 abutment connection
7 sleeve
8 rail section end
9 groove
12 weld seam
13 end of the weld seam
14 angle
15 side surface
16 contact surface
20a, 20b profile
21 angle
22 profile head
23 profile body
24 gap
25a, 25b first web portion
26a, 26b second web portion
27a, 27b third web portion
28a, 28b fourth web portion
29a, 29b upper profile wall
30a, 30b profile side wall
31 slot
32a, 32b lower profile wall
33a, 33b end portion
34 suspension
36a, 36b bead
35 pivot-in part
37 pivot bolt
38 counterbearing
39 contact line holder
40 contact line
41 punch-out
42 latching lug
43 main body
44 tab
45 barb-like protrusion
47 groove
46a, 46b web
48 T-shaped web
L longitudinal middle plane
H hollow chamber

The invention claimed is:

1. Arrangement consisting of a rail for suspended tracks or suspension cranes and of a contact line holder attached thereto, wherein the rail has a profile body and a profile head connected thereto and disposed above the profile body, wherein the profile body is c-shaped when seen in cross-section, forms a hollow chamber for travelling mechanisms and is formed with a slot open in the downwards direction, the profile body has upper profile walls extending essentially horizontally and the contact line holder is disposed inside the hollow chamber in the region of the upper profile walls and is attached to the upper profile walls, wherein a large number of punch-outs are provided in the upper profile walls and, when seen in the longitudinal direction of the rail, are disposed in at least one row and at regular repeated intervals and barb-like latching lugs are disposed on the contact line holder and engage into the punch-outs to effect attachment, wherein latching lugs of the contact line holders are disposed in only some of the large number of punch-outs.

2. Arrangement as claimed in claim 1, wherein as seen in the longitudinal direction of the rail, at least two rows of punch-outs are disposed next to each other and the punch-outs of the at least two rows are disposed spaced apart from and next to each other in relation to the longitudinal direction of the rail.

3. Arrangement as claimed in claim 2, wherein the punch-outs are disposed on both sides of webs connecting the profile head and the profile body.

4. Arrangement as claimed in claim 2, wherein the latching lugs are disposed in pairs on the contact line holder for engagement into two of the punch-outs.

5. Arrangement as claimed in claim 2, wherein profile side walls, which extend in a slightly inclined manner downwards towards a longitudinal middle plane of the profile body, adjoin the upper profile walls, lower profile walls adjoin the lower end of the profile side walls and are inclined downwards towards the lower slot.

6. Arrangement as claimed in claim 2, wherein the profile head, as seen in cross-section, is a profile head which is essentially C-shaped and open in the upwards direction, the opening of which forms a gap extending along the longitudinal middle plane.

7. Arrangement as claimed in claim 2, wherein the punch-outs are formed in a rectangular, in particular square, manner as seen in plan.

8. Arrangement as claimed in claim 7, wherein the latching lugs are disposed in pairs on the contact line holder for engagement into two of the punch-outs.

9. Arrangement as claimed in claim 7, wherein profile side walls, which extend in a slightly inclined manner downwards towards a longitudinal middle plane of the profile body, adjoin the upper profile walls, lower profile walls adjoin the lower end of the profile side walls and are inclined downwards towards the lower slot.

10. Arrangement as claimed in claim 7, wherein the profile head, as seen in cross-section, is a profile head which is essentially C-shaped and open in the upwards direction, the opening of which forms a gap extending along the longitudinal middle plane.

11. Arrangement as claimed in any one of claim 7, wherein the punch-outs are disposed on both sides of webs connecting the profile head and the profile body.

12. Arrangement as claimed in claim 11, wherein the latching lugs are disposed in pairs on the contact line holder for engagement into two of the punch-outs.

13. Arrangement as claimed in claim 1, wherein the latching lugs are disposed in pairs on the contact line holder for engagement into two of the punch-outs.

14. Arrangement as claimed in claim 13, wherein profile side walls, which extend in a slightly inclined manner downwards towards a longitudinal middle plane of the profile body, adjoin the upper profile walls, lower profile walls adjoin the lower end of the profile side walls and are inclined downwards towards the lower slot.

15. Arrangement as claimed in claim 14, wherein the profile head, as seen in cross-section, is a profile head which is essentially C-shaped and open in the upwards direction, the opening of which forms a gap extending along the longitudinal middle plane.

16. Arrangement as claimed in claim 1, wherein the punch-outs are formed in a rectangular, in particular square, manner as seen in plan.

17. Arrangement as claimed in claim 16, wherein the punch-outs are disposed on both sides of webs connecting the profile head and the profile body.

18. Arrangement as claimed in claim 1, wherein the punch-outs are disposed on both sides of webs connecting the profile head and the profile body.

19. Arrangement as claimed in claim 1, wherein profile side walls, which extend in a slightly inclined manner downwards towards a longitudinal middle plane of the profile body, adjoin the upper profile walls, lower profile walls adjoin the lower end of the profile side walls and are inclined downwards towards the lower slot.

20. Arrangement as claimed in claim 1, wherein the profile head, as seen in cross-section, is a profile head which is essentially C-shaped and open in the upwards direction, the opening of which forms a gap extending along the longitudinal middle plane.

* * * * *